(12) United States Patent
Cooper et al.

(10) Patent No.: US 7,672,310 B2
(45) Date of Patent: Mar. 2, 2010

(54) METHOD AND APPARATUS FOR DYNAMICALLY CHANGING THE PREAMBLE LENGTH OF A BURST COMMUNICATION

(75) Inventors: Michael J. Cooper, Marietta, GA (US); Wei-Hung Hui, Sharon, MA (US); John L. Moran, Uxbridge, MA (US); Marc L. Morrissette, Plainville, MA (US)

(73) Assignee: General Instrument Corporation, Horsham, PA (US)

( * ) Notice: Subject to any disclaimer, the term of this patent is extended or adjusted under 35 U.S.C. 154(b) by 695 days.

(21) Appl. No.: 11/374,447

(22) Filed: Mar. 13, 2006

(65) Prior Publication Data

US 2007/0211618 A1 Sep. 13, 2007

(51) Int. Cl.
*H04L 12/28* (2006.01)

(52) U.S. Cl. .................. 370/395.21; 370/235; 370/349; 375/219; 375/316

(58) Field of Classification Search ................. 370/203, 370/312, 337, 347, 432, 442, 470, 473, 395.21, 370/236, 349; 375/219–316
See application file for complete search history.

(56) References Cited

U.S. PATENT DOCUMENTS

| | | | |
|---|---|---|---|
| 5,251,324 A | 10/1993 | McMullan | |
| 5,631,846 A | 5/1997 | Szurkowski | |
| 5,939,887 A | 8/1999 | Schmidt et al. | |
| 5,943,604 A | 8/1999 | Chen et al. | |
| 6,032,019 A | 2/2000 | Chen et al. | |
| 6,272,150 B1 | 8/2001 | Hraster et al. | |
| 6,278,730 B1 | 8/2001 | Tsui et al. | |
| 6,321,384 B1 | 11/2001 | Eldering | |
| 6,334,219 B1 | 12/2001 | Hill et al. | |
| 6,434,583 B1 | 8/2002 | Dapper et al. | |
| 6,512,616 B1 | 1/2003 | Nishihara | |
| 6,559,756 B2 | 5/2003 | Al-Araji | |
| 6,570,913 B1 | 5/2003 | Chen | |
| 6,606,351 B1 | 8/2003 | Dapper | |
| 6,700,875 B1 | 3/2004 | Schroeder et al. | |
| 6,711,134 B1 | 3/2004 | Wichelman et al. | |
| 6,741,947 B1 | 5/2004 | Wichelman et al. | |
| 6,757,253 B1 | 6/2004 | Cooper et al. | |
| 6,772,437 B1 | 8/2004 | Cooper et al. | |
| 6,961,370 B2 | 11/2005 | Chappell | |
| 6,967,994 B2 * | 11/2005 | Boer et al. | .................. 375/219 |
| 6,985,437 B1 | 1/2006 | Vogel | |

(Continued)

OTHER PUBLICATIONS

"PCT International Search Report and Written Opinion", Issued Jan. 8, 2008 from the International Searching Authority.

*Primary Examiner*—Phuc H Tran
(74) *Attorney, Agent, or Firm*—Larry T. Cullen

(57) ABSTRACT

Preamble length of burst communication signals dynamically changed to compensate in changes to linear distortion of a communication channel. Pre-equalization coefficients are provided to network element which pre-equalize communications with the CMTS. Long preamble lengths are used for a select few communications while short preamble lengths are used for the rest of the communication signals. When change in distortion characteristics is detected, a station maintenance is performed on the affected network element and new pre-equalization coefficients are determined and provided to the network element. Alternatively, all communications may be provided with long preamble lengths and communications may continue while the CMTS determines new pre-equalization coefficients.

29 Claims, 4 Drawing Sheets

U.S. PATENT DOCUMENTS

| | | |
|---|---|---|
| 7,050,419 B2 | 5/2006 | Azenkot et al. |
| 7,158,542 B1 * | 1/2007 | Zeng et al. ............... 370/513 |
| 7,554,902 B2 | 6/2009 | Kim et al. |
| 2001/0055319 A1 | 12/2001 | Quigley et al. |
| 2002/0154620 A1 | 10/2002 | Azenkot et al. |
| 2003/0028898 A1 | 2/2003 | Howald |
| 2003/0179768 A1 | 9/2003 | Lusky et al. |
| 2003/0179770 A1 | 9/2003 | Resnik et al. |
| 2003/0179821 A1 | 9/2003 | Lusky et al. |
| 2003/0181185 A1 | 9/2003 | Lusky et al. |
| 2003/0185176 A1 | 10/2003 | Lusky et al. |
| 2004/0042385 A1 | 3/2004 | Kim et al. |
| 2004/0047284 A1 | 3/2004 | Eidson |
| 2004/0073937 A1 | 4/2004 | Williams |
| 2005/0025145 A1 | 2/2005 | Rakib et al. |
| 2005/0039103 A1 | 2/2005 | Azenkot et al. |
| 2005/0058082 A1 * | 3/2005 | Moran et al. ............... 370/252 |
| 2005/0122996 A1 | 6/2005 | Azenkot et al. |
| 2005/0163088 A1 | 7/2005 | Yamano et al. |
| 2005/0183130 A1 | 8/2005 | Sadja et al. |
| 2005/0198688 A1 | 9/2005 | Fong |
| 2005/0226161 A1 | 10/2005 | Jaworski |
| 2007/0086328 A1 * | 4/2007 | Kao et al. ............... 370/208 |

* cited by examiner

METHOD AND APPARATUS FOR DYNAMICALLY CHANGING THE PREAMBLE LENGTH OF A BURST COMMUNICATION

FIELD OF THE INVENTION

This disclosure is directed toward adapting the length of the preambles utilized in a communication signal. More specifically, this disclosure is directed toward adapting the length of the preambles utilized in the various burst type communications.

BACKGROUND OF THE INVENTION

There are generally two types of equalization that exist in the return path of a communication signal in accordance with the data over cable system (DOCSIS) specification: 1) Pre-Equalization and 2) Post-Equalization. Post-equalization generally refers to a process that happens only in a cable modem termination system (CMTS). During post-equalization, the CMTS begins with an initial equalizer (for example, all 0's except for the main equalizer tap which begins with a 1). The CMTS then adapts/modifies the equalizer coefficients (via a feedback process) to compensate for any linear distortion that the signal has encountered. Linear distortion of the signal might result from the network element (e.g. modem) transmitter, cable plant, or CMTS receiver. The CMTS resets the equalizer to its initial values prior to the start of each new burst regardless of which network element the burst is coming from. As a result, a substantial number of incoming symbols at the beginning of each burst are often received before the post-equalizer is adequately converged, e.g., 100 symbols may be required for adequate convergence for most cable plants. The number of symbols required for convergence depends upon several factors, such as the "whiteness" of the symbols that the equalizer is trained on and the degree of linear distortion impacting the signal.

The DOCSIS protocol deals with the large number of symbols required for convergence by allowing the operator to configure the preamble length and preamble sequence such that the post-equalizer can obtain convergence during a preamble. A longer preamble length allows the CMTS post-equalizer to better converge prior to actually receiving the data payload portion of the upstream burst. Since, the CMTS resets its post-equalizer to its initial value prior to each data burst, the operator must send longer preambles for ALL data types, e.g., Initial Maintenance (IM), Station Maintenance (SM), Short Data (SD), Long Data (LD), Advanced Short (AS), Advanced Long (AL), and Unsolicited Grant Service (UGS). The longer preambles introduce higher overhead associated with the data packets and can have dramatic impacts on very short data packets, such as Voice over Internet protocol (VOIP). Moreover, for post-equalization every burst must be lengthened with a longer preamble to allow the equalizer to converge prior to receiving the data burst. If the preamble is not lengthened the equalizer may still be training (attempting to converge) during the beginning portion of the data payload, which greatly increases the likelihood of errors during the data transmission.

Pre-equalization relies on the modems or network elements to transmit a corrected communication signal to compensate for distortions. Pre-equalization requires the CMTS to store the equalizer coefficients for a given network element and then send them to the network element. The network element may then pre-distort its transmitted signal in such a way as to compensate for the distortion received by the CMTS. As a result, the CMTS should not see any (or at least minimal) distortion with its post-equalizer when a network element is transmitting with its pre-equalizer values. The CMTS obtains the pre-equalization values by training its equalizer using the network element station maintenance bursts during periodic ranging requests, and then sends the correct equalizer values to the network element in a ranging response message back to the network element. Successful periodic ranging is required to happen at a rate of at least every 30 seconds and generally occurs between 10-20 seconds. Thus, for pre-equalization, the ranging Interval Usage Code (IUC) (3,4) preambles must be long while the data IUC (1, 5, 6, 9, 10, 11) can utilize short preambles, which results in lower overhead.

However with pre-equalization, when distortion changes, such as when connected devices such as televisions, cable set top boxes or cable modems are powered on or off, the system is unable to compensate for this change until the next station maintenance interval which could be as much as 30 seconds later. This means as much as 30 seconds worth of data transmission may be lost, which is a catastrophic event for a VoIP call. Conversely, for post-equalization, both ranging IUC (3, 4) and data IUC (1, 5, 6, 9, 10, 11) preambles are all long to allow the CMTS to retrain for every burst. This better assures that packets will not be lost when distortion changes within the plant but at the expense of greater overhead due to longer preambles for all the data bursts.

SUMMARY OF THE INVENTION

An apparatus for communicating with network elements in accordance with the invention may comprise: a transmission unit capable of transmitting signals to network elements; a receiver unit capable of receiving signals from the network elements; and a microprocessor configured to adjust the length of preambles associated with a signal to be transmitted by the network elements to provide preambles of a first length to a first group of communication signals to be transmitted by the network elements and to provide preambles of a second length to a second group of communication signals to be transmitted by the network elements, wherein the first length is longer than the second length.

In accordance with the apparatus of the invention, the first group of communication signals may include IM and/or SM burst messages.

An apparatus of the invention may further comprise an equalizer unit configured to determine a change in distortion characteristics of the network in an affected network element's communication.

In accordance with the apparatus of the invention, the microprocessor may be configured to instruct a SM to be scheduled for the affected network element if a change in distortion characteristics is detected.

In accordance with the apparatus of the invention, the equalizer unit may be further configured to determine pre-equalization coefficients during an SM session and the microprocessor may be configured to instruct transmission of the pre-equalization coefficients to the affected network element.

In accordance with the apparatus of the invention, the microprocessor may be configured to instruct holding data grants to the affected network element during an SM session.

In accordance with the apparatus of the invention, the microprocessor may be configured to provide preambles of a first length to all communication signals by the affected network element.

In accordance with the apparatus of the invention, the equalizer unit may be further configured to determine pre-equalization coefficients from the preamble of a first length and the microprocessor may be configured to instruct transmission of the pre-equalization coefficients to the affected network element.

In accordance with the apparatus of the invention, a change in distortion characteristics may be determined by monitoring energy in taps of the equalizer coefficients, may be determined by monitoring a microreflection metric, or may be determined by monitoring a change in a modulation error ratio.

A method of communicating with network elements which perform pre-equalization using pre-equalization coefficients according to the invention may comprise the steps of: determining if the distortion characteristics of a network associated with an affected network element have changed; and if the distortion characteristics have not changed, providing preambles of a first length to a first group of communication signals to be transmitted by the network elements and providing preambles of a second length to a second group of communication signals to be transmitted by the network elements, wherein the first length is longer than the second length.

In accordance with the method, the first group of communication signals may include IM and/or SM burst messages.

The method may further include the step of instructing a SM to be scheduled for the affected network element if a change in distortion characteristics is detected.

The method may further include the steps of determining new pre-equalization coefficients during an SM session and providing the new pre-equalization coefficients to the affected network element.

The method may further comprise the step of holding data grants to the affected network element during an SM session.

The method may further comprise the step of providing preambles of a first length to all communication signals to be transmitted by the affected network element if a change in distortion characteristics is detected, and the pre-equalization coefficients are determined from the preambles of a first length.

In accordance with the method, a change in distortion characteristics may be determined by monitoring energy in taps of equalizer coefficients.

In accordance with the method, a change in distortion characteristics may be determined by monitoring a change in a modulation error ratio.

A computer readable medium containing instructions for a computer to perform a method of communicating with network elements which perform pre-equalization using pre-equalization coefficients in accordance with the invention, the method may comprise the steps of: determining if the distortion characteristics of a network associated with an affected network element have changed; and if the distortion characteristics have not changed, providing preambles of a first length to a first group of communication signals to be transmitted by the network elements and to providing preambles of a second length to a second group of communication signal to be transmitted by the network elements, wherein the first length is longer than the second length.

The computer readable medium may contain instructions to perform the step of instructing a SM to be scheduled for the affected network element if a change in distortion characteristics is detected.

The computer readable medium may contain instructions to provide preambles of a first length to all communication signals to be transmitted by the affected network element if a change in distortion characteristics is detected, and the pre-equalization coefficients are determined from the preamble of a first length.

A better approach to the equalization problem is a compromise where the system can more quickly respond to these types of distortion dynamics without loosing multiple seconds of data while not incurring the excess overhead of a full post-equalization implementation. This disclosure outlines such a process.

BRIEF DESCRIPTION OF THE DRAWINGS

In accordance with the principles of the invention.

DETAILED DESCRIPTION OF THE INVENTION

Figure 1:
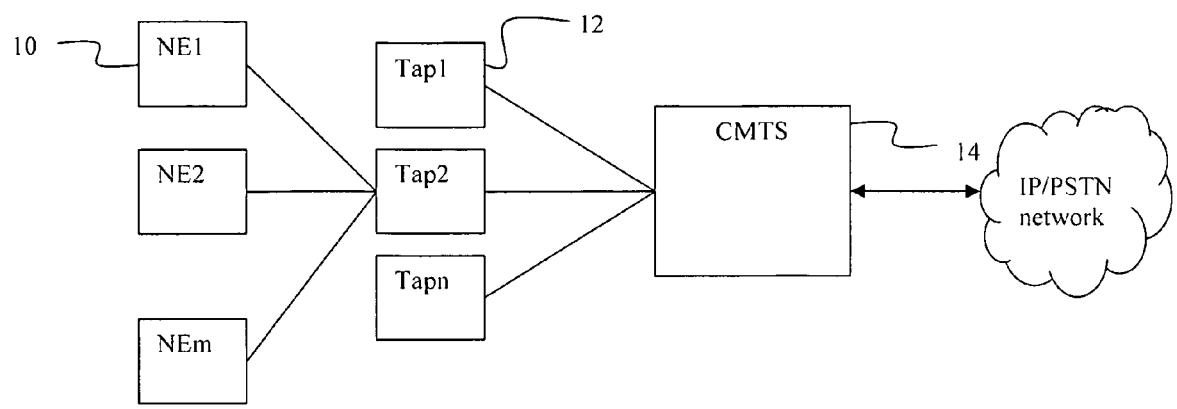
FIG. 1 illustrates an exemplary network in accordance with the principles of the invention.

FIG. 1 illustrates an exemplary network in which a plurality of network elements 10 (e.g. cable modems, set top boxes, televisions equipped with set top boxes, or any other element on a network such as an HFC network) are connected to a cable modem termination system (CMTS) 14 through a network tap 12. Those of skill in the art will appreciate that there may be a plurality of network taps 12, each of which are connected to a plurality of network elements 10.

Figure 2:
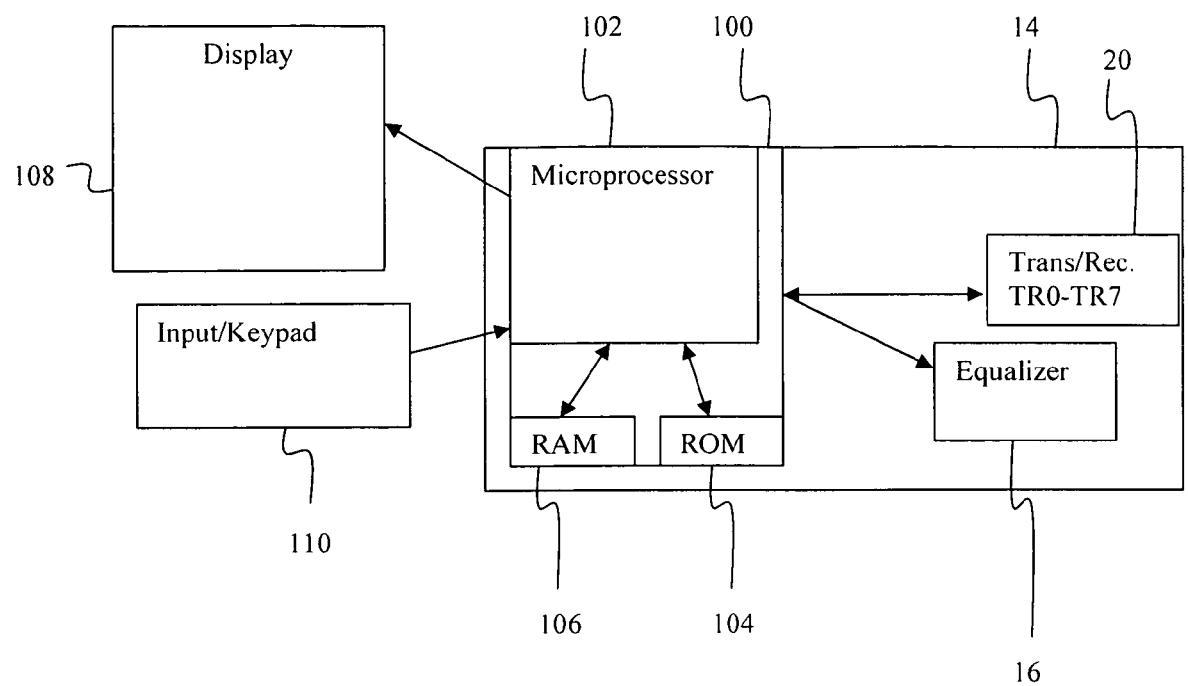
FIG. 2 illustrates an exemplary CMTS architecture in accordance with the principles of the invention.

FIG. 2 illustrates a logical architecture of an exemplary CMTS 14. As illustrated in FIG. 2, CMTS 14 may contain a processing unit 100 which may access a RAM 106 and a ROM 104, and may control the operation of the CMTS 14 and the length of the preamble associated with communication signals to be sent by the network elements 12. Processing unit 100 preferably contains a microprocessor 102 which may receive information, such as instructions and data, from a ROM 104 or RAM 106. Processing unit 100 is preferably connected to a display 108, such as a CRT or LCD display, which may display status information such as whether a station maintenance (SM) is being performed or an unregistered receiver is eligible for load balancing. An input keypad 110 may also be connected to processing unit 100 and may allow an operator to provide instructions, processing requests and/or data to processor 100.

An equalizer 16 may be associated with a transmitter/receiver (transceiver) unit 20 which preferably provides bi-directional communication with a plurality of network elements 10 through a plurality of network taps 12. Those of skill in the art will appreciate that CMTS 14 may contain a plurality of transceivers, e.g. 8 transceivers. Each transceiver may support over 100 network elements. Transceiver 20, such as a Broadcom 3140 receiver (transceiver), is preferably used to acquire equalizer values and burst modulation error ratio (MER) measurements. The communication characteristics of each receiver 20 may be stored on ROM 104 or RAM 106, or may be provided from an external source, such as the head-end. RAM 104 and/or ROM 106 may also carry instructions for microprocessor 102 to perform the processes illustrated in any or all of FIG. 3.

Figure 3:
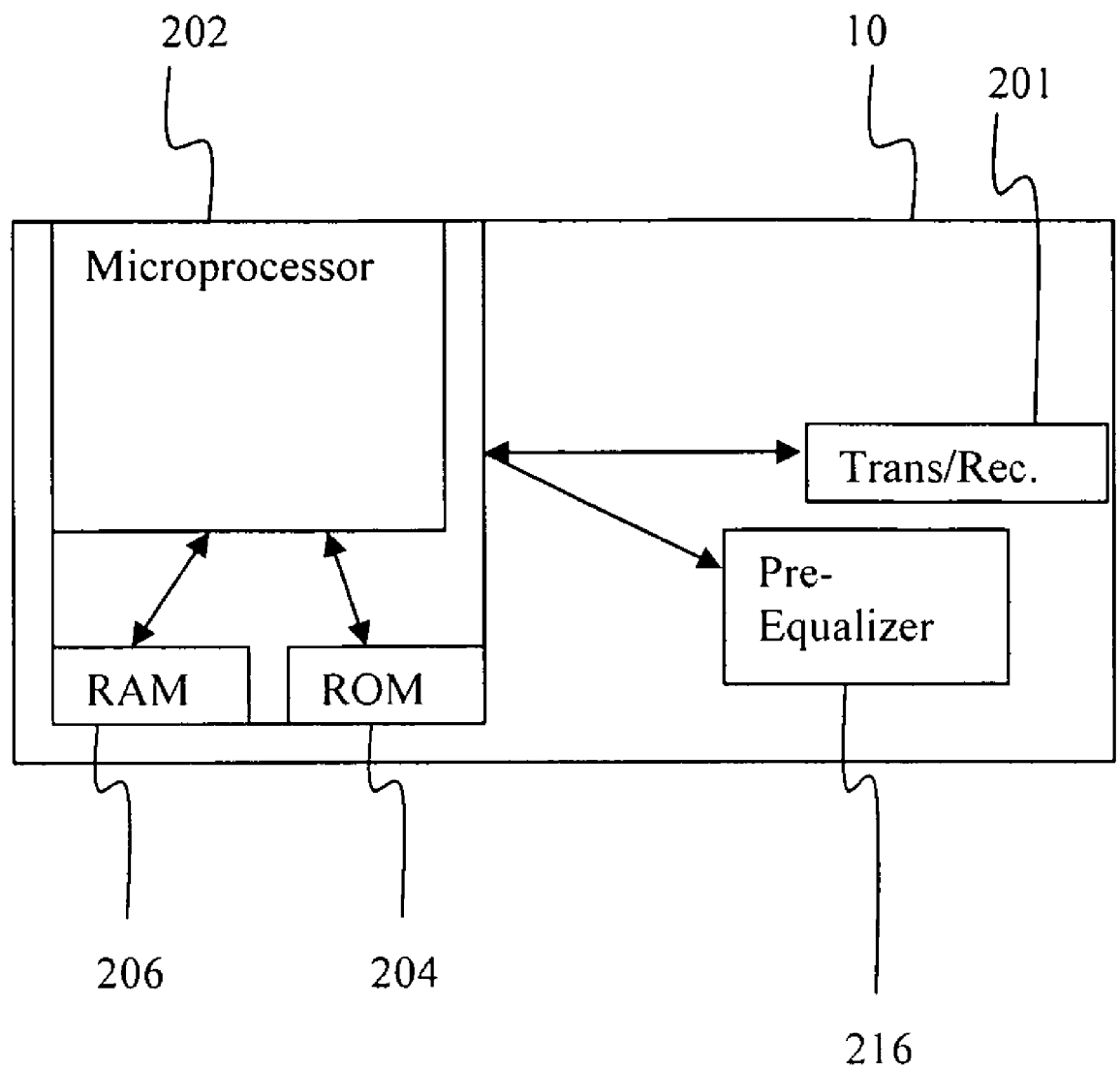
FIG. 3 illustrates an exemplary architecture of a network element which may communicate with an exemplary CMTS of the present invention.

FIG. 3 illustrates an exemplary network element 10, such as a cable modem. Network element 10 preferably contains a processor 202 which may communicate with a RAM 206 and ROM 204, and which controls the general operation of the network element, including the pre-equalization parameters and preamble lengths of communications sent by the network element in accordance with instructions from the CMTS 14.

In accordance with the principles of the invention, the equalization system can quickly respond to distortion dynamics without loosing multiple seconds of data and without incurring the excess overhead of a full post-equalization implementation. The invention provides the benefits of a post-equalization approach and a pre-equalization approach.

The invention relies on several assumptions as follows:

An active cable data system is providing services (Voice, Video, Data) on downstream and upstream paths. Upstream is active on channel frequency X. The following procedure may be repeated for each active upstream channel.

A receiver, such as a Broadcom 3140 receiver, may be used to acquire equalizer values and burst modulation error ratio (MER) measurements.

In a preferred implementation, an active channel provides services via an upstream channel through transceiver 20. The system upstream channel is preferably configured for an optimized pre-equalization mode of operation in which the preamble lengths for IM and SM are long (100 to 300 symbols) while the preamble lengths for all the other bursts (REQ, SD, LD, AS, AL, UGS) are very short (less than 100 symbols). Equalizer values are preferably forwarded to each of the network elements, and are used as pre-equalization values. As a result, the post-equalization performed by the CMTS is yielding little or no additional equalization. This system configuration results in low overhead and efficient operation because only the IM and SM intervals are loaded with a long preamble to support periodic network element updates.

The preamble length is preferably defined by an upstream channel descriptor (UCD). A preamble preferably consists of a portion which is a repetitive sequence and an equalizer training signal. A suitable equalizer training signal preferably has a spectral quality to enable an equalizer to adapt to the burst. The equalizer training signal may be in the form of uniformly random repeating data, e.g. white data. A long preamble preferably provides a longer equalizer training signal (e.g. about 100 to about 300 symbols) and a short preamble preferably provides a shorter equalizer training signal (e.g. about 100 symbols or less).

Figure 4:
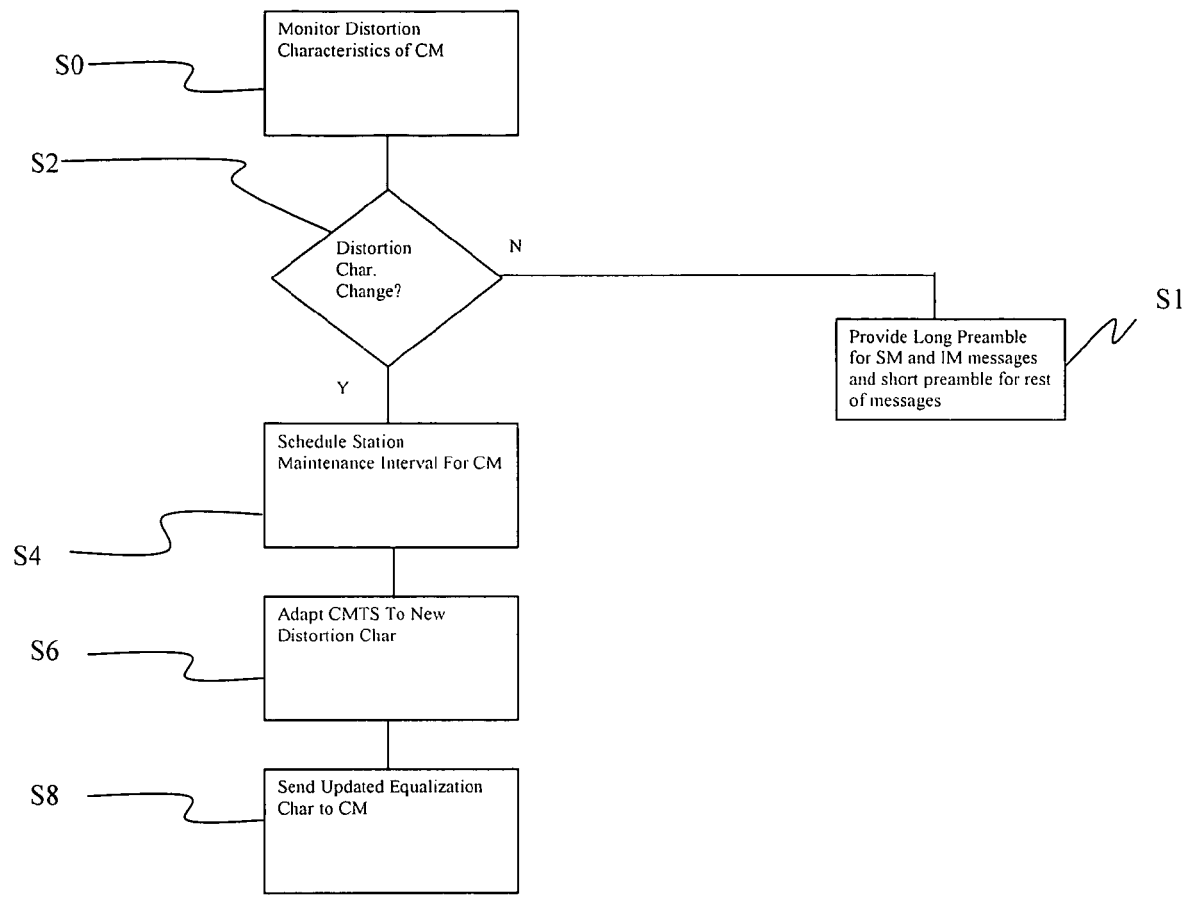
FIG. 4 illustrates an exemplary process in accordance with the principles of the present invention.

For the given upstream channel, the CMTS preferably monitors the distortion characteristics of each network element as illustrated in FIG. 4. As illustrated in FIG. 4, the CMTS monitors distortion characteristics in signals received from each network element, such as each cable network element, step S0 and step S2. A change in the distortion characteristics preferably may be detected by monitoring the post-equalization coefficients from the CMTS, and/or by detecting a change in the modulation error ratio (MER). Relative to monitoring post-equalization coefficients, while the CM is transmitting with a set of pre-equalizer coefficients which compensate for the cable plant, the CMTS adapts its post-equalizer. For example, the microreflection metric, which is defined by the DOCSIS standard as a ratio of energy in the main equalizer tap to the sum of energy in all other equalizer taps, may be monitored. If the cable plant has remained constant, then the network element's pre-equalizer should adequately equalize the return communications and the CMTS post-equalizer should be near ideal (i.e. there will be very little energy in the non-main taps of the equalizer coefficients). Conversely, if the plant changes such that the network element pre-equalizer is no longer correct, then the CMTS post-equalizer will reflect significant energy in the non-main taps.

A change in distortion characteristics may also be detected by monitoring a change in MER. This approach requires that the CMTS maintain MER values for each network element. If a sudden change in MER is detected, then the distortion characteristics are determined to have changed. One shortcoming of this approach is that other impairments which are reflected in a MER measurement but are not due to changes in linear distortion may be detected as change in the distortion characteristics. These impairments include impulse and ingress noise and non-linear distortion affects. Therefore, the first triggering methodology may be preferred.

If the distortion characteristics have not changed, step S2, NO, then long preambles are provided for IM and SM message bursts only, step S1. Short preambles are provided for all other message bursts, including (REQ, SD, LD, AS, AL, UGS). A short preamble may be less than about 100 symbols and a long preamble may be longer than 100 symbols and as long as about 300 symbols.

If the distortion characteristics have changed, step S2, YES, a station maintenance (SM) session is scheduled for the network element affected, step S4. As used herein, SM session is a period of time during which the CMTS is adjusting ranging parameters for network element. Those of skill in the art will appreciate that the CMTS will continue to send adjustments to the ranging parameters (which include power, timing, frequency, and equalizer coefficients) to the network element until sufficient accuracy is reached at which point ranging is declared a success. During the SM session the CMTS post-equalizer preferably completely adapts to the new plant characteristics, step S6. The CMTS then sends the updated equalizer coefficients to the network element, step S8. This process generally only needs to happen for the network element that was exhibiting the distortion change as the plant distortion changes are usually unique to network tap locations. The other network elements within the plant will generally not suffer from this distortion change.

The CMTS scheduler may hold off on data grants to the particular network element during step S4 until the new equalizer coefficients are provided to the network element in step S8. In this manner, data loss may be prevented to at most a single data packet, e.g., the packet upon which the initial plant distortion change was detected. Further, the process in steps S4-S8 could be completed within several 100 milliseconds and should not have any operator detectable impact on services.

Alternatively to scheduling an SM and holding off on data grants during step S4, the UCD could be immediately changed so that long preambles are added to all data bursts including REQ, SD, LD, AS, AL, and UGS. This increase in the preamble length would remain in affect until updated coefficients are sent to the impacted network elements. The negative of this approach is it reduces the efficiency of the channel (due to long preambles) for approximately 30 seconds while equalizer updates are sent to network elements. However, network elements are not held off for data transmissions using this approach. Also, if other network elements are present on the network tap and are impacted by this same change in plant distortion, this technique results in updates to each of these network elements without requiring an additional triggering event that would be needed by the previous processes.

The above algorithm operated under the assumption that the system upstream channel is configured for an optimized pre-equalization mode of operation. Conversely, the CMTS may operate under the condition that in addition to REQ, SD, LD, AS, AL, and UGS bursts utilizing very short preambles, a very short preamble is also used for the SM interval, which yields some improvement in efficiency. This may be utilized when the CMTS has started with an initial configuration with a long preamble for SM bursts and the equalizer coefficients have been forwarded to each of the network elements to be used for pre-equalization. As a result, the post-equalization performed by the CMTS is yielding little or no additional equalization. Further, when a change in the plant distortion is detected in step S2, the UCD is preferably modified so that long preambles are utilized on the SM bursts prior to scheduling the SM interval for the impacted cable network element. After the new equalizer values are relayed to the cable network element, the CMTS may reconfigure the UCD back to a shorter preamble value.

The processes in FIG. 4 may be implemented in hard wired devices, firmware or software running in a processor. A processing unit for a software or firmware implementation is preferably contained in the CMTS. Any of the processes illustrated in FIG. 4 may be contained on a computer readable medium which may be read by microprocessor 102. A computer readable medium may be any medium capable of carrying instructions to be performed by a microprocessor, including a CD disc, DVD disc, magnetic or optical disc, tape, silicon based removable or non-removable memory, packetized or non-packetized wireline.

Those of skill in the art will appreciate that the present invention allows reduced overhead for communications while providing an equalization approach that quickly responds to distortion dynamics. The reduced overhead in the form of short preambles for most types of data communications allows the network to be more efficient in term of cost and communication processing time. The integrity of the communication data is also preserved by quickly responding to distortion dynamics.

What is claimed is:

1. An apparatus for communicating with network elements comprising:
    a transmission unit capable of transmitting signals to network elements;
    a receiver unit capable of receiving signals from the network elements;
    an equalizer unit configured to determine a change in distortion characteristics of the network in an affected network element's communication; and
    a microprocessor configured to adjust the length of preambles associated with a signal to be transmitted by the network elements to provide preambles of a first length to a first group of communication signals to be transmitted by the network elements and to provide preambles of a second length to a second group of communication signals to be transmitted by the network elements,
    wherein the first length is longer than the second length, and if the distortion characteristics have not changed, providing preambles of a first length to a first group of communication signals to be transmitted by the network elements and providing preambles of a second length to a second group of communication signals to be transmitted by the network elements.

2. The apparatus of claim 1, wherein the first group of communication signals include Initial Maintenance (IM) and Station Maintenance (SM) burst messages.

3. The apparatus of claim 1, wherein the first group of communication signals includes IM burst messages.

4. The apparatus of claim 1, wherein the microprocessor is configured to instruct a SM session to be scheduled for the affected network element if a change in distortion characteristics is detected.

5. The apparatus of claim 4, wherein the equalizer unit is further configured to determine pre-equalization coefficients during an SM session and the microprocessor is configured to instruct transmission of the pre-equalization coefficients to the affected network element.

6. The apparatus of claim 4, wherein the microprocessor is configured to instruct holding data grants to the affected network element during an SM session.

7. The apparatus of claim 1, wherein the microprocessor is configured to provide preambles of a first length to all communication signals to be transmitted by the affected network element.

8. The apparatus of claim 7, wherein the equalizer unit is further configured to determine pre-equalization coefficients from the preamble of a first length and the microprocessor is configured to instruct transmission of the pre-equalization coefficients to the affected network element.

9. The apparatus of claim 1, wherein a change in distortion characteristics is determined by monitoring energy in taps of the equalizer coefficients.

10. The apparatus of claim 1, wherein a change in distortion characteristics is determined by monitoring a change in a modulation error ratio.

11. The apparatus of claim 1, wherein a change in distortion characteristics is determined by monitoring a microreflection metric.

12. A method of communicating with network elements which perform pre-equalization using pre-equalization coefficients comprising the steps of:
    determining if the distortion characteristics of a network associated with an affected network element have changed; and
    if the distortion characteristics have not changed, providing preambles of a first length to a first group of communication signals to be transmitted by the network elements and providing preambles of a second length to a second group of communication signals to be transmitted by the network elements,
    further comprising the step of instructing a SM to be scheduled for the affected network element if a change in distortion characteristics is detected,
    wherein the first length is longer than the second length.

13. The method of claim 12, wherein the first group of communication signals includes IM and SM burst messages.

14. The method of claim 12, wherein the first group of communication signals includes IM burst messages.

15. The method of claim 12, further including the steps of determining new pre-equalization coefficients during an SM session and providing the new pre-equalization coefficients to the affected network element.

16. The method of claim 12, further comprising the step of holding data grants to the affected network element during an SM session.

17. The method of claim 12, further comprising the step of providing preambles of a first length to all communication signals to be transmitted by the affected network element if a change in distortion characteristics is detected, and the pre-equalization coefficients are determined from the preambles of a first length.

18. The method of claim 12, wherein a change in distortion characteristics is determined by monitoring energy in taps of equalizer coefficients.

19. The method of claim 12, wherein a change in distortion characteristics is determined by monitoring a change in a modulation error ratio.

20. The method of claim 12, wherein a change in distortion characteristics is determined by monitoring a microreflection metric.

21. A computer readable medium containing instructions for a computer to perform a method of communicating with network elements which perform pre-equalization using pre-equalization coefficients comprising the steps of:
   determining if the distortion characteristics of a network associated with an affected network element have changed; and
   if the distortion characteristics have not changed, providing preambles of a first length to a first group of communication signals to be transmitted by the network elements and providing preambles of a second length to a second group of communication signals to be transmitted by the network elements,
   further comprising the step of instructing a SM to be scheduled for the affected network element if a change in distortion characteristics is detected,
   wherein the first length is longer than the second length.

22. The computer readable medium of claim 21, wherein the first group of communication signals includes IM and SM burst messages.

23. The computer readable medium of claim 21, wherein the first group of communication signals includes IM burst messages.

24. The computer readable medium of claim 21, further including the steps of determining new pre-equalization coefficients during an SM session and providing the new pre-equalization coefficients to the affected network element.

25. The computer readable medium of claim 21, further comprising the step of holding data grants to the affected network element during an SM session.

26. The computer readable medium of claim 21, further comprising instruction to perform the step of providing preambles of a first length to all communication signals to be transmitted by the affected network element if a change in distortion characteristics is detected, and the pre-equalization coefficients are determined from the preamble of a first length.

27. The computer readable medium of claim 21, wherein a change in distortion characteristics is determined by monitoring energy in taps of equalizer coefficients.

28. The computer readable medium of claim 21, wherein a change in distortion characteristics is determined by monitoring a change in a modulation error ratio.

29. The computer readable medium of claim 21, wherein a change in distortion characteristics is determined by monitoring a microreflection metric.

* * * * *